United States Patent [19]
Cannon et al.

[11] Patent Number: 6,098,074
[45] Date of Patent: Aug. 1, 2000

[54] STORAGE MANAGEMENT SYSTEM WITH FILE AGGREGATION

[75] Inventors: David Maxwell Cannon; Michael Allen Kaczmarski, both of Tucson, Ariz.

[73] Assignee: International Business Machines Corporation, Armonk, N.Y.

[21] Appl. No.: 08/960,423

[22] Filed: Oct. 29, 1997

[51] Int. Cl.$^7$ .................................................. G06F 17/30
[52] U.S. Cl. ........................................... 707/200; 707/204
[58] Field of Search ................................ 707/1, 200, 204, 707/205, 206, 2

[56] References Cited

U.S. PATENT DOCUMENTS

| | | | |
|---|---|---|---|
| 4,027,288 | 5/1977 | Barton et al. | 340/172.5 |
| 4,310,883 | 1/1982 | Clifton et al. | 364/200 |
| 4,499,539 | 2/1985 | Vosacek | 364/200 |
| 5,218,696 | 6/1993 | Baird et al. | 395/600 |
| 5,403,639 | 4/1995 | Belsan et al. | 395/600 |
| 5,423,034 | 6/1995 | Cohen-Levy et al. | 395/600 |
| 5,513,351 | 4/1996 | Grantz | 395/600 |
| 5,535,390 | 7/1996 | Hildebrandt | 395/700 |
| 5,561,793 | 10/1996 | Bennett et al. | 395/600 |
| 5,579,507 | 11/1996 | Hosouchi et al. | 395/497.02 |
| 5,592,669 | 1/1997 | Robinson et al. | 395/622 |
| 5,619,699 | 4/1997 | Golshani et al. | 395/705 |
| 5,623,667 | 4/1997 | Golshani et al. | 395/705 |
| 5,627,967 | 5/1997 | Dauerer et al. | 395/188.01 |
| 5,627,985 | 5/1997 | Fetterman et al. | 395/393 |
| 5,634,050 | 5/1997 | Krueger et al. | 395/616 |
| 5,644,766 | 7/1997 | Coy et al. | 395/620 |
| 5,649,200 | 7/1997 | Leblang et al. | 395/703 |
| 5,673,382 | 9/1997 | Fetterman et al. | 395/373 |
| 5,715,455 | 2/1998 | Macon, Jr. et al. | 395/621 |
| 5,727,197 | 3/1998 | Burgess et al. | 395/602 |
| 5,745,752 | 4/1998 | Hurvig et al. | 395/616 |
| 5,764,978 | 6/1998 | Msumoto | 395/611 |
| 5,794,279 | 8/1998 | French et al. | 707/2 |

FOREIGN PATENT DOCUMENTS

WO 97/08623  3/1997  WIPO .............................. G06F 13/00

OTHER PUBLICATIONS

Abstract No. 89–144137 for JP 01–144137, T. Nishimura, "File Managing System".

"DASD Fast Write from Multiple Sources Using Journals", *IBM Technical Disclosure Bulletin*, vol. 38, No. 6, Jun. 1995, pp. 425–431.

"Packing Variable–Sized Segments in the Swap File of a Paging–Based Virtual Memory System", *IBM Technical Disclosure Bulletin*, vol. 39, No. 3, Mar. 1996, pp. 301–302.

"Optical Library Cache Reclaim Strategies", *IBM Technical Disclosure Bulletin*, vol. 37, No. 6B, Jun. 1994, pp. 469–471.

*Primary Examiner*—Paul V. Kulik
*Attorney, Agent, or Firm*—Gary Cary Ware Freidenrich

[57] ABSTRACT

A data storage subsystem employs managed files, each comprising one or an aggregation of multiple individual, constituent user files, to reduce file management overhead costs. After receiving user files from a client station, the subsystem creates a contiguous managed file by aggregating selected ones of the received user files according to certain predetermined criteria. Managed file creation and use are transparent to the client stations. To aid in file management, the subsystem provides a mapping table that lists, for each user file, a corresponding location of that user file within a managed file. With this hardware and table structure, the system conducts file management with reduced overhead. For example, internal data management operations include an improved copy operation where a managed file is copied as a contiguous unit between first and second locations in the data storage subsystem. In addition to internal data management operations, the subsystem satisfies client output requests, including retrieve operations initiated when the subsystem receives a retrieval request and identified user file from a client station. In response, the subsystem employs the mapping table to find the identified user file's location in the managed file. Referencing the identified user file's location in the managed file enables the subsystem to obtain a copy of the identified user file, which is ultimately provided to the requesting client station.

61 Claims, 6 Drawing Sheets

STORAGE MANAGEMENT SYSTEM WITH FILE AGGREGATION

BACKGROUND OF THE INVENTION

1. Field of the Invention

The present invention relates to the storage of digital data signals. More particularly, the invention concerns the storage and use of "managed" files, each comprising one or an aggregation of multiple constituent "user" files, in order to reduce file management overhead costs.

2. Description of the Related Art

The electronic management of data is central in this information era. Scientists and engineers have provided the necessary infrastructure for widespread public availability of an incredible volume of information. The internet is one chief example. In addition, the high-technology industry is continually achieving faster and more diverse methods for transmitting and receiving data. Some examples include satellite communications and the ever-increasing baud rates of commercially available computer modems.

With this information explosion, it is increasingly important for users to have some means for storing and conveniently managing their data. In this respect, the development of electronic data storage systems is more important than ever. And, engineers have squarely met the persistent challenge of customer demand by providing speedier and more reliable storage systems.

As an example, engineers at INTERNATIONAL BUSINESS MACHINES® (IBM®) have developed various flexible systems called "storage management servers", designed to store and manage data for remotely located clients. One particular system is called the ADSTAR™ Distributed Storage Manager (ADSM™) product. With the ADSM product, a central server is coupled to multiple client platforms and one or more administrators. The server provides storage, backup, retrieval, and other management functions for the server's clients.

Although the ADSM product includes some significant advances and also enjoys significant commercial success today, IBM has continually sought to improve the performance and efficiency of this and other data storage systems. One area of particular focus is the time associated with storing a customer's file in a storage facility. Obviously, this time includes the actions of physically storing the data, known as input/output or "I/O" time. Additionally, file storage requires the expenditure of various "overhead" time, including (1) preparing the media to store the data ("media preparation overhead"), and (2) updating pointers, databases, tables, directories, catalogs, and other information maintained about the stored data ("bookkeeping overhead"). In the case of tape media, preparing the media for storage involves positioning the tape and advancing the tape to a desired speed. With disk media, preparation of the media requires time to spin-up the media, and also "seek time" to find a desired sector and track to begin writing.

The storage of each file requires both media preparation overhead and bookkeeping overhead, delaying completion of the entire storage process. The overhead for storage of a file is independent of that file's size. Thus, the overhead for a large file is overshadowed by its more substantial I/O time. The opposite is true with small files, where the necessary overhead dominates the file storage process compared to the file's relatively short I/O time. Consequently, I/O time is the chief obstacle in speedier storage of large files, whereas overhead prevents small files from being stored faster.

Although some useful solutions have been proposed for these problems, IBM is nevertheless seeking better ways of addressing these problems to further improve the performance and the efficiency of its products to benefit its customers.

SUMMARY OF THE INVENTION

Broadly, the present invention concerns the storage and use of managed files, each comprising one or an aggregation of multiple constituent user files, in order to reduce file management overhead costs. Managed files containing multiple user files in aggregation are referred to as "aggregate" files. File management is conducted in a storage management system including a data storage subsystem coupled to one or more client stations. The subsystem receives multiple user files from a client station. In response, the subsystem creates a contiguous managed file by aggregating selected received user files in accordance with certain predetermined criteria. Creation and use of the managed file is transparent to the client stations. To aid in managing the aggregate files, the subsystem provides a mapping table. The mapping table includes a first table that lists, for each user file contained in a managed file, a corresponding location of that user file within that managed file.

With this hardware and table structure, the system is able to conduct file management with reduced overhead by grouping smaller user files into larger aggregate files. For example, internal data management operations are performed, including at least a copy operation. Copying involves copying a managed file as a contiguous unit from a first location in the data storage subsystem to a second location in the data storage subsystem.

In addition to internal data management operations, the subsystem satisfies client output requests, including at least a retrieve operation. A retrieve operation starts when the subsystem receives a retrieval request, identifying a user file, from a client station. In response, the subsystem employs the mapping table to determine the identified user file's location in a managed file. Referencing the identified user file's location in its managed file enables the subsystem to obtain a copy of the identified user file. Finally, the subsystem provides the file copy to the requesting client station.

Accordingly, in one embodiment, the invention may be implemented to provide a method of file management using aggregated user files. In another embodiment, the invention may be implemented to provide an apparatus, such as a data storage subsystem, configured to manage files including aggregated user files. In still another embodiment, the invention may be implemented to provide a signal-bearing medium tangibly embodying a program of machine-readable instructions executable by a digital data processing apparatus to perform method steps for file management using aggregated user files.

The invention affords its users with a number of distinct advantages. Chiefly, the invention reduces file management overhead costs due to the management of multiple individual files as a combined aggregate file. This yields faster file storage, movement, copying, and backup. Especially advantageous is the transparency of the managed files to the end user. The invention also provides a number of other advantages and benefits, which should be apparent from the following description of the invention.

DETAILED DESCRIPTION OF THE PREFERRED EMBODIMENTS

Figure 1:
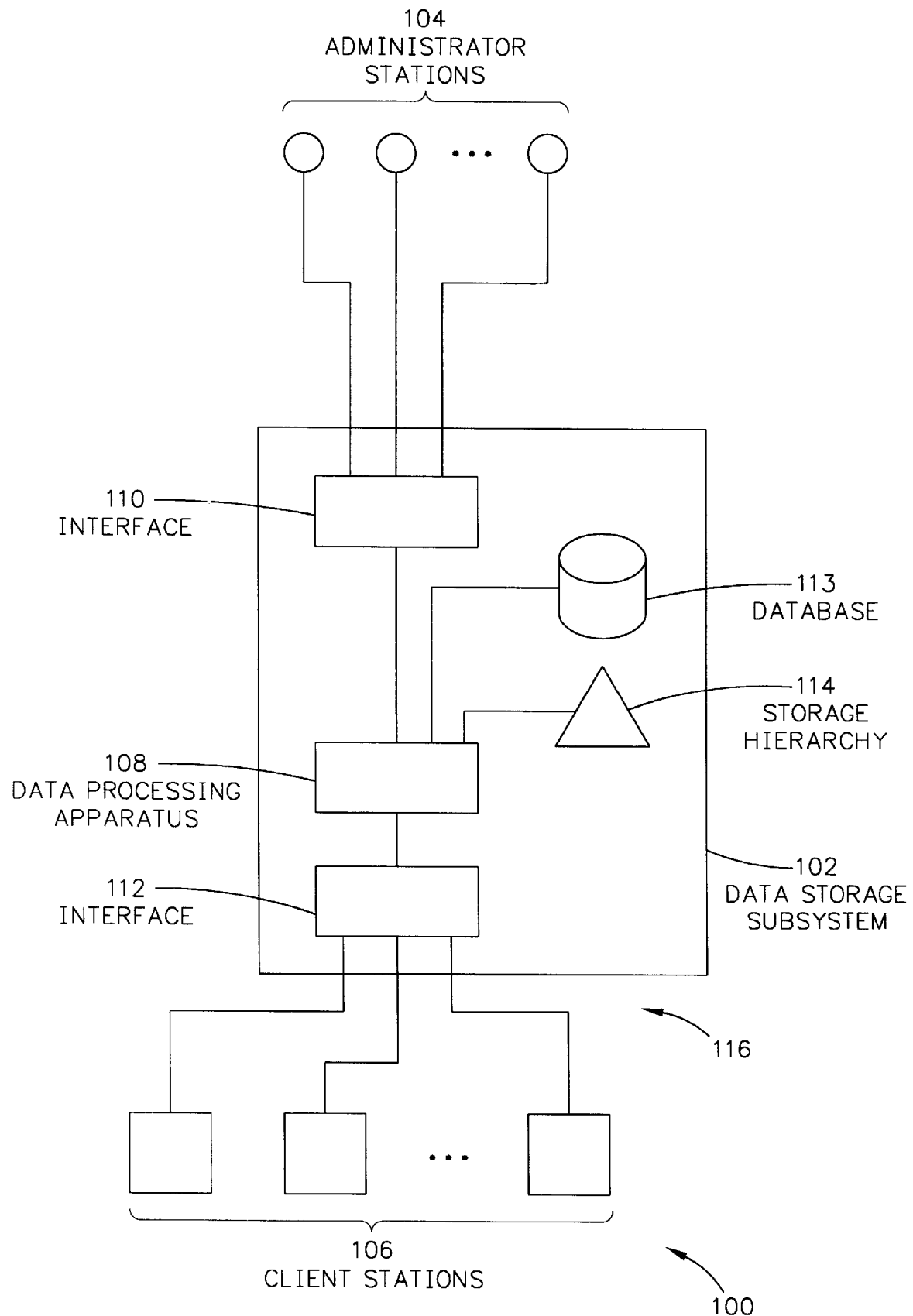
FIG. 1 is a block diagram of the hardware components and interconnections of a storage management system in accordance with the invention.

The nature, objects, and advantages of the invention will become more apparent to those skilled in the art after considering the following detailed description in connection with the accompanying drawings. As mentioned above, the invention concerns the storage and use of "managed" files, each comprising an aggregation of one or multiple individual "user" files, in order to reduce file management overhead costs. This overhead reduction is especially significant with small user files.

HARDWARE COMPONENTS & INTERCONNECTIONS

General Description of Data Storage System

Introduction

One aspect of the invention concerns a storage management system, which may be embodied by various hardware components and interconnections. One example is shown by the storage management system 100 of FIG. 1. Broadly, the system 100 includes a data storage subsystem 102, one or more administrator stations 104, and one or more client stations 106. The subsystem 102 operates in response to directions of the client stations 106, as well as the administrator stations 104.

The administrator stations 104 are used by system administrators to configure, monitor, and repair the subsystem 102. Under direction of an end user, the client stations 106 use the subsystem 102 to store and manage data on their behalf. More particularly, each client station 106 creates and regards data in the form of "user files". In this regard, each client station 106 separately employs the subsystem 102 to archive, backup, retrieve, and restore its user files. Accordingly, each user file is associated with a single client station 106, which is the source of that user file.

Client Stations

Each client station 106 may comprise any general purpose computer, such as an RS-6000 based workstation, PENTIUM processor based personal computer, mainframe computer, etc. The client stations 106 may comprise similar or different machines, running the similar or different operating systems. Some exemplary operating systems include VMS, MVS, UNIX, OS/2, WINDOWS-NT, OS-400, DOS, etc.

The client stations 106 are interconnected to the subsystem 102 by a network 116. The network 116 may comprise any desired connection, including one or more conductive wires or busses, fiber optic lines, data communication channels, wireless links, internet connections, telephone lines, etc. Preferably, a high speed communication channel such as a T3 link is used, employing a network protocol such as APPC or TCP/IP.

Administrator Stations

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

Data Storage Subsystem: Subcomponents

In an exemplary embodiment, the data storage subsystem 102 may comprise a commercially available server such as an IBM ADSM product. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the network 116 and the client stations 106 via an interface 112, and likewise exchanges signals with the administrator stations 104 via an interface 110. The interfaces 110/112 may comprise any suitable device for communicating with the implemented embodiment of client station and administrator station. For example, the interfaces 110/112 may comprise ETHERNET cards, small computer system interfaces ("SCSIs"), parallel data ports, serial data ports, telephone modems, fiber optic links, wireless links, etc.

The data processing apparatus 108 is also coupled to a database 113 and a storage hierarchy 114. As discussed in greater detail below, the storage hierarchy 114 is used to store "managed files". A managed file may include an individual user file (stored as such), or multiple constituent user files stored together as an "aggregate" file. The subsystem's storage of user files protects these files from loss or corruption on the client's machine, assists the clients by freeing storage space at the client stations, and also provides more sophisticated management of client data. In this respect, operations of the storage hierarchy 114 include "archiving" files from the client stations 106, "backing up" files of the client stations 106 contained in the storage hierarchy 114, "retrieving" stored files for the client stations 106, and "restoring" files backed-up on the hierarchy 114.

The database 113 contains information about the files contained in the storage hierarchy 114. This information, for example, includes the addresses at which files are stored, various characteristics of the stored data, certain client-specified data management preferences, etc. The contents of the database 113 are discussed in detail below.

More Detail: Exemplary Data Processing Apparatus

Figure 2:
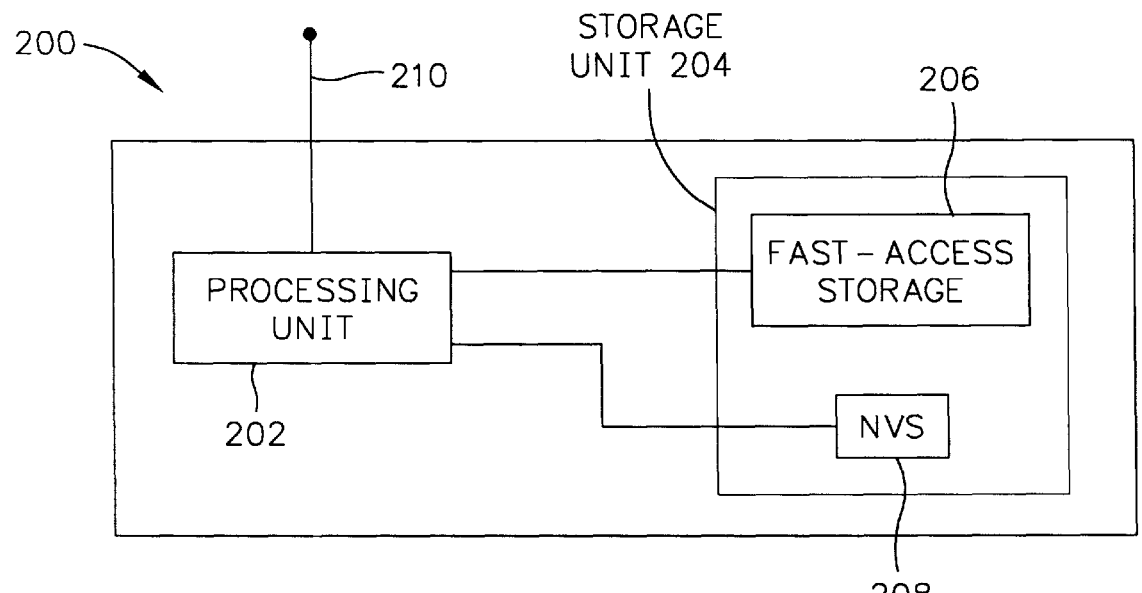
FIG. 2 is a block diagram of a digital data processing machine in accordance with the invention.

The data processing apparatus 108 may be embodied by various hardware components and interconnections. FIG. 2 shows one example, in the form of a digital data processing apparatus 200.

The apparatus 200 includes a processing unit 202, such as a microprocessor or other processing machine, coupled to a storage unit 204. In the present example, the storage unit 204 includes a fast-access storage 206 as well as nonvolatile storage 208. The fast-access storage 206 preferably comprises random access memory, and may be used to store programming instructions executed by the processing unit 202. The nonvolatile storage 208 may comprise, for example, one or more magnetic data storage disks such as a "hard drive", a tape drive, or any other suitable storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206/208 may be eliminated; furthermore, the storage unit 204 may be provided on-board the processing unit 202, or even provided externally to the apparatus 200.

More Detail: Storage Hierarchy

Figure 4:
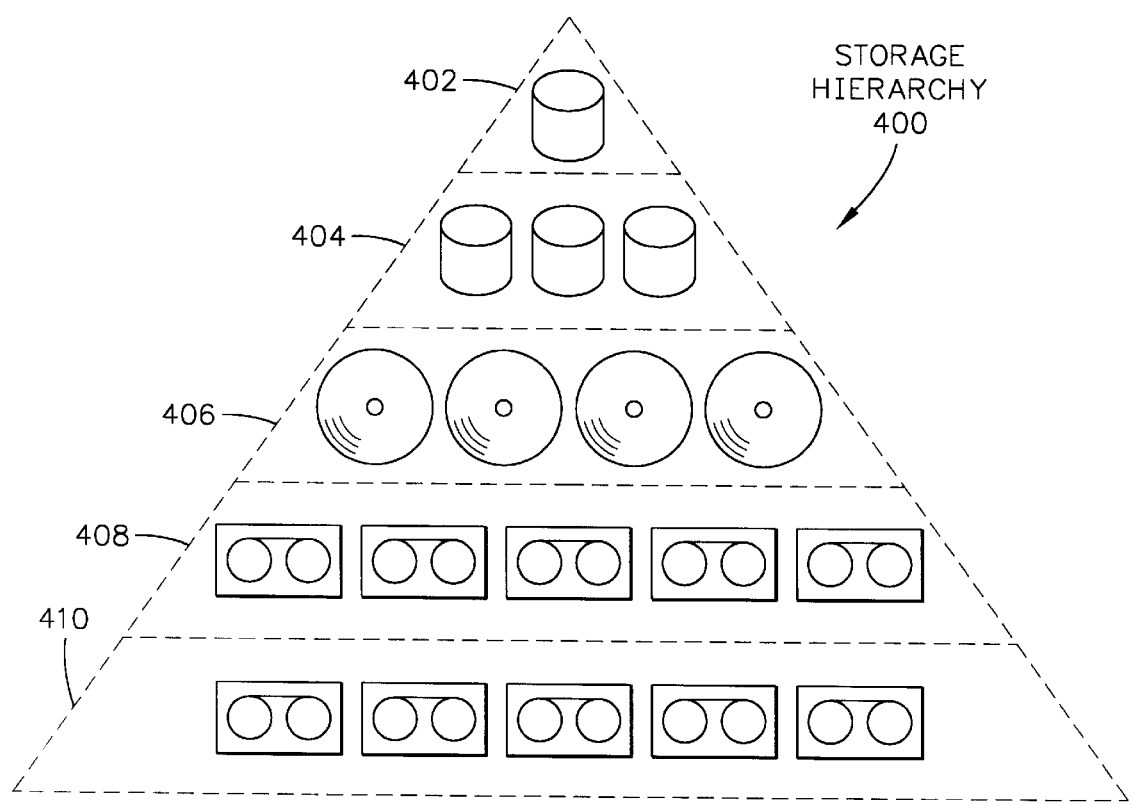
FIG. 4 is a block diagram showing the subcomponents of an illustrative storage hierarchy in accordance with the invention.

The storage hierarchy 114 may be implemented in storage media of various number and characteristics, depending upon the clients' particular requirements. To specifically illustrate one example, FIG. 4 depicts a representative storage hierarchy 400. The hierarchy 400 includes multiple levels 402–410, where successively higher levels represent incrementally higher storage performance. The levels 402–410 provide storage devices with a variety of features and performance characteristics.

In this example, the first level 402 includes high-speed storage devices, such as magnetic hard disk drives, writable optical disks, or other direct access storage devices ("DASDs"). The level 402 provides the fastest data storage and retrieval time among the levels 402–410, albeit the most expensive. The second level 404 includes DASDs with less desirable performance characteristics than the level 402, but with lower expense. The third level 406 includes multiple optical disks and one or more optical disk drives. The fourth and fifth levels 408–410 include even less expensive storage means, such as magnetic tape or another sequential access storage device.

The levels 408–410 may be especially suitable for inexpensive, long-term data archival, whereas the levels 402–406 are appropriate for short-term fast access data storage. As an example, one or more devices in the level 402 and/or level 404 may even be implemented to provide a data storage cache.

Devices of the levels 402–410 may be co-located with the subsystem 102, or remotely located, depending upon the user's requirements. Thus, storage devices of the hierarchy 400 may be coupled to the data processing apparatus 108 by a variety of means, such as one or more conductive wires or busses, fiber optic lines, data communication channels, wireless links, internet connections, telephone lines, SCSI connection, ESCON connect, etc.

Although not shown, the hierarchy 400 may be implemented with a single device type, and a corresponding single level. Ordinarily skilled artisans will recognize the "hierarchy" being used illustratively, since the invention prefers but does not require a hierarchy of storage device performance.

In the context of the storage hierarchy 114/400, the term "storage pool" is used to identify a group of storage devices with similar performance characteristics. For instance, the level 404 may be comprised of several storage pools, each pool including one or more DASDs.

More Detail: Database

Introduction

As mentioned above, the database 113 is used to store various information about data contained in the storage hierarchy 114. This information, for example, includes the addresses at which managed files are stored in the storage hierarchy 114, various characteristics of the stored data, certain client-specified data management preferences, etc.

File Aggregation

One of the key features of the present invention is storage and use of "managed" files, each comprising an aggregation of one or multiple constituent "user" files. The "user" files are created by the client stations 106, and managed by the subsystem 102 as a service to the client stations 106. The subsystem 102's use of managed files, however, is transparent to the client stations 106, which simply regard user files individually. This "internal" management scheme helps to significantly reduce file management overhead costs by using managed files constructed as aggregations of many different user files. In particular, the subsystem 102 treats each managed file as a single file during backup, move, and other subsystem operations, reducing the file management overhead to that of a single file.

Figure 5:
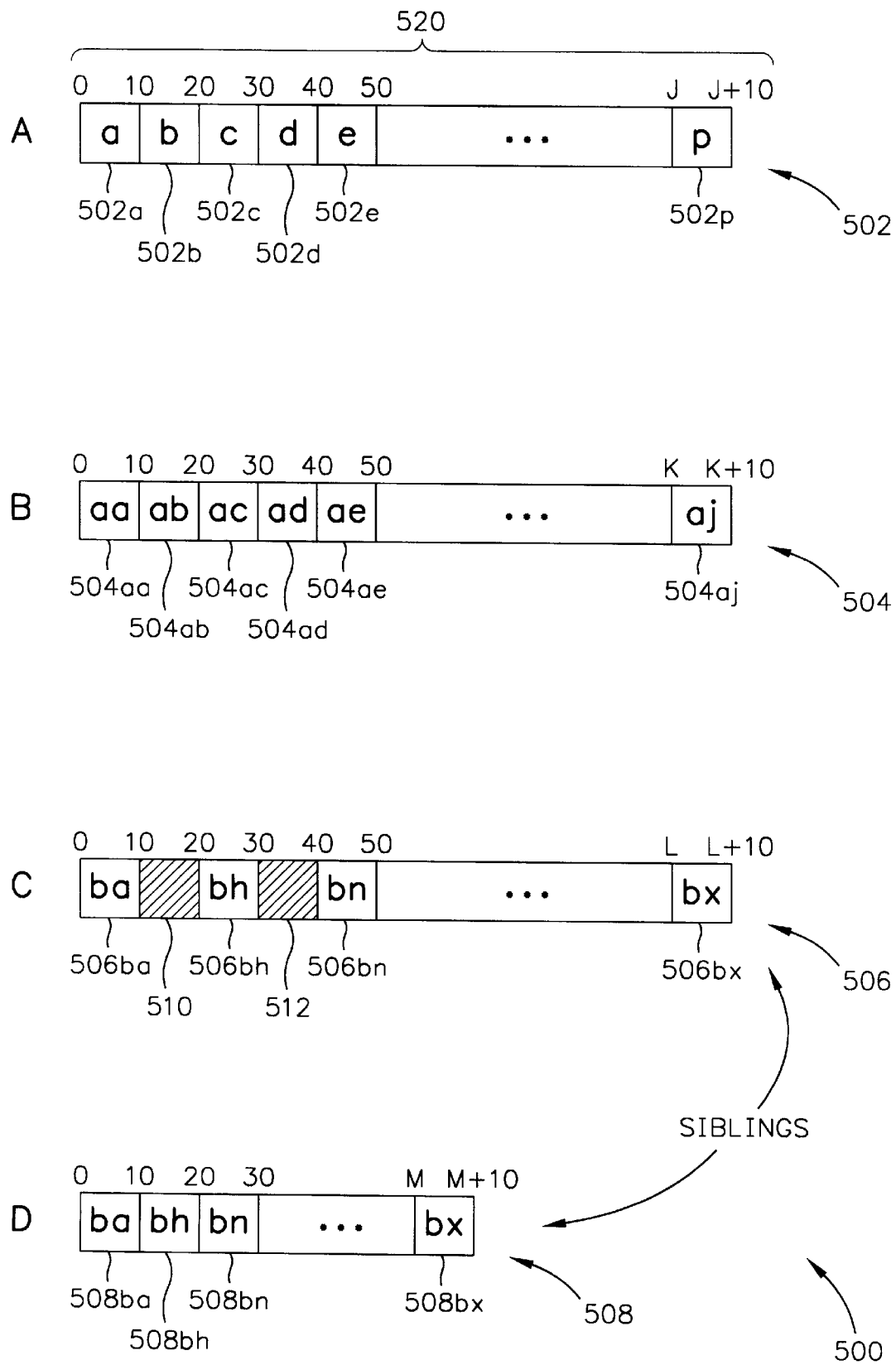
FIG. 5 is a block diagram showing the interrelationship of various illustrative user files and managed files.

FIG. 5 shows an exemplary set of four managed files 502–508. Managed files are also referenced by corresponding alphabetic designators A–D, for simpler representation in various tables shown below. For ease of explanation, upper case alphabetic designators refer to aggregate files, whereas lower case designators point out user files.

The managed file 502 includes multiple user files 502a–502p (also identified by alphabetic designators a–p). The user files 502a–502p are preferably stored adjacent to each other to conserve storage space. The position of each user file in the managed file 502 is denoted by a corresponding one of the "offsets" 520. In an exemplary implementation, the offsets may represent bytes of data. Thus, the first user file 502a has an offset of zero bytes, and the second user file 502b has an offset of ten bytes. In the simplified example of FIG. 5, all user files are ten bytes long.

FIG. 5 also depicts other managed files 504, 506, and 508, each including various user files. Managed files 502 and 504 include different sets of user files. In contrast, the managed files 506 and 508 contain completely identical sets of constituent user files. In this example, the managed file 506 contains unused areas 510/512 that were once occupied by user files later deleted. As shown in FIG. 5, the files 506ba, 506bh, 506bn. . . 506bx are present in both managed files 506 and 508. In this case, the managed file 508 represents a consolidation of the managed file 506, created by the subsystem 102 during an operation called "reclamation", as discussed below.

Tables

The database 113 is composed of various information including tables that store information about data contained in the storage hierarchy 114. These tables include: an inventory table, a storage table, a mapping table, and a managed file attributes table. Each table provides a different type of information, exemplified in the description below. Ordinarily skilled artisans (having the benefit of this disclosure) will quickly recognize that the tables shown below are merely examples, that this data may be integrated, consolidated, or otherwise reconfigured, and that their structure and contents may be significantly changed, all without departing from the scope of the present invention. For example, instead of tables, this data may be organized as one or more object-oriented databases.

Inventory Table

One table in the database 113 is the inventory table, an example of which is depicted in Table 1 (below). The inventory table contains information specific to each user file stored in the subsystem 102, regardless of the location and manner of storing the user files. Generally, the inventory table cross-references each user file with various "client" information and various "policy" information. More particularly, each user file is listed by its filename, which may comprise any alphabetic, alphanumeric, numeric, or other code uniquely associated with that user file. The inventory table contains one row for each user file.

The client information includes information relative to the client station 106 with which the user file is associated. In the illustrated example, the client information is represented by "client number", "client type", and "source" columns. For each user file, the "client number" column identifies the originating client station 106. This identification may include a numeric, alphabetic, alphanumeric, or other code. In this example, a numeric code is shown. The "client type" column associates the client with one or more predetermined categories, such as different computer types, operating systems, communications parameters, etc. The "source" column lists a location in the client station 106 where the user file is stored locally by the client. As a specific example, a user file's source may comprise a directory in the client station.

In contrast to the client information of Table 1, the policy information includes information concerning the client's preferences for data management by the subsystem 102. Optimally, this information includes the client's preferences themselves, as well as information needed to implement these preferences. In the illustrated example, the policy information is represented by "data retention time" as well as other (not shown) columns, listing a maximum number of backup versions to maintain, timestamps of backed-up data, etc.

TABLE 1

Inventory Table

| USER FILE-NAME | CLIENT NUMBER | CLIENT TYPE | SOURCE | ... | POLICY DATA RETENTION TIME | ... |
|---|---|---|---|---|---|---|
| a | 1 | Unix | /usr | | 30 days | |
| b | 1 | Unix | /usr | | 30 days | |
| c | 1 | Unix | /usr | | 30 days | |
| d | 1 | Unix | /usr | | 30 days | |
| e | 1 | Unix | /usr | | 30 days | |
| ... | 1 | Unix | /usr | | 30 days | |
| p | 1 | Unix | /usr | | 30 days | |
| aa | 27 | OS/2 | d:\data | | 90 days | |
| ab | 27 | OS/2 | d:\data | | 90 days | |
| ac | 27 | OS/2 | d:\data | | 90 days | |
| ad | 27 | OS/2 | d:\data | | 90 days | |
| ae | 27 | OS/2 | d:\data | | 90 days | |
| ... | 27 | OS/2 | d:\data | | 90 days | |
| aj | 27 | OS/2 | d:\data | | 90 days | |
| ba | 3 | Windows '95 | c:\data | | 365 days | |
| bh | 3 | Windows '95 | c:\data | | 365 days | |
| bn | 3 | Windows '95 | c:\data | | 365 days | |
| bx | 3 | Windows '95 | c:\data | | 365 days | |

Storage Table

Another table in the database 113 is the storage table, an example of which is depicted in Table 2 (below). In contrast to the inventory table (described above), the storage table contains information about where each managed file is stored in the storage hierarchy 114. The storage table contains a single row for each managed file.

In the illustrated example, the storage table includes "managed filename", "storage pool", "volume", "location", and other columns. The "managed filename" column lists all managed file's filenames. Like the user files, each managed file has a filename that comprises a unique alphabetic, alphanumeric, numeric, or other code. For each managed file, the "storage pool" identifies a subset of the storage hierarchy 114 where the managed file resides. As mentioned above, each "storage pool" is a group of storage devices of the storage hierarchy 114 having similar performance characteristics. For instance, each of the DASDs 402, DASDs 404, optical disks 406, tapes 408, and tapes 410 may be divided into one or more storage pools. Identification of each storage pool may be made by numeric, alphabetic, alphanumeric, or another unique code. In the illustrated example, numeric codes are used.

The "volume" column identifies a sub-part of the identified storage pool. In the data storage arts, data is commonly grouped, stored, and managed in "volumes", where a volume may comprise a tape or a portion of a DASD. The "location" column identifies the corresponding managed file's location within the volume. As an example, this value may comprise a track/sector combination (for DASDs or optical disks), a tachometer reading (for magnetic or optical tape), etc.

TABLE 2

Storage Table

| MANAGED FILENAME | STORAGE POOL | VOLUME | LOCATION | ... |
|---|---|---|---|---|
| A | 1 | 39 | 1965 | |
| B | 1 | 39 | 1967 | |
| C | 1 | 2 | 16495 | |
| D | 2 | 11 | 1818 | |

Mapping Table

Another table in the database 113 is the mapping table, an example of which is depicted in Table 3 (below). Generally, this table operates to bidirectionally cross-reference between managed files and user files. The mapping table identifies, for each managed file, all constituent user files. Conversely, for each user file, the mapping table identifies one or more managed files containing that user file. In this respect, the specific implementation of Table 3 includes a "managed→user" column and a "user→managed" column.

The "managed→user" column contains multiple rows for each managed file, each row identifying one constituent user file of that managed file. Each row identifies a managed/user file pair by the managed filename ("managed filename" column) and the user filename ("user filename").

Conversely, each row of the "user→managed" column lists a single user file by its name ("user filename" column), cross-referencing this user file to one managed file containing the user file ("managed filename"). If the user file is present in additional managed files, the mapping table contains another row for each additional such managed file. In each row, identifying one user/managed file pair, the row's user file is also cross-referenced to the user file's length ("length" column) and its offset within the aggregated file of that pair ("offset" column). In this example, the length and offset are given in bytes.

TABLE 3

Mapping Table

| (MANAGED → USER) | | (USER → MANAGED) | | | |
|---|---|---|---|---|---|
| MANAGED FILENAME | USER FILE-NAME | USER FILE-NAME | MANAGED FILENAME | LENGTH | OFFSET |
| A | a | a | A | 10 | 0 |
| | b | b | A | 10 | 10 |
| | c | c | A | 10 | 20 |
| | d | d | A | 10 | 30 |

TABLE 3-continued

Mapping Table

| (MANAGED → USER) | | (USER → MANAGED) | | | |
|---|---|---|---|---|---|
| MANAGED FILENAME | USER FILE-NAME | USER FILE-NAME | MANAGED FILENAME | LENGTH | OFFSET |
| | e | e | A | 10 | 40 |
| | ... | ... | A | 10 | ... |
| | p | p | A | 10 | J |
| | | aa | B | 10 | 0 |
| B | aa | ab | B | 10 | 10 |
| | ab | ac | B | 10 | 20 |
| | ac | ad | B | 10 | 30 |
| | ad | ae | B | 10 | 40 |
| | ae | ... | B | 10 | ... |
| | ... | aj | B | 10 | K |
| | aj | ba | C | 10 | 0 |
| | | ba | D | 10 | 0 |
| C | ba | bh | C | 10 | 20 |
| | bh | bh | D | 10 | 10 |
| | bn | bn | C | 10 | 40 |
| | ... | bn | D | 10 | 20 |
| | bx | ... | ... | 10 | ... |
| | | bx | C | 10 | L |
| D | ba | bx | D | 10 | M |
| | bh | | | | |
| | bn | | | | |
| | ... | | | | |
| | bx | | | | |

Managed File Attributes Table

Another table in the database 113 is the managed file attributes table, an example of which is depicted in Table 4 (below). This table accounts for the fact that, after time, a managed file may contain some empty space due to deletion of one or more constituent user files. As explained below, the subsystem 102 generally does not consolidate a managed file upon deletion of one or more constituent user files. This benefits the efficient operation of the subsystem 102, by minimizing management of the aggregate files.

Instead, to conserve storage space, the invention performs "reclamation" to remove unused space between and within managed files. This procedure, discussed below, relies upon knowledge of managed file attributes, as maintained in the managed file attributes table.

Each row of the managed file attributes table represents a different managed file, identified by its managed filename ("managed filename" column). A row's managed file is cross-referenced to columns specifying the managed file's original size upon creation ("original size"), present size not including deleted user files ("active size"), and number of non-deleted user files ("active files").

Other Tables

The database 113 may also be implemented to include a number of other tables, if desired, the content and structure being apparent to those of ordinary skill in the art (having the benefit of this disclosure). Some or all of these tables, for instance, may be added or incorporated into various existing tables discussed above. In a preferred embodiment, the database 113 includes a backup directory table (not shown) that indicates whether, for storage pool backup operations, each device or medium in the storage hierarchy 114 is designated as a primary device, designated as a backup device, or has no designation yet.

TABLE 4

Managed File Attributes Table

| MANAGED FILENAME | ORIGINAL SIZE | ACTIVE SIZE | ACTIVE FILES |
|---|---|---|---|
| A | J + 10 | J + 10 | 16 |
| B | K + 10 | K + 10 | 10 |
| C | L + 10 | M + 10 | 13 |
| D | M + 10 | M + 10 | 13 |

OPERATION

In addition to the various hardware embodiments described above, a different aspect of the invention concerns a method of storing and using "managed" files, implemented using hardware components such as those disclosed above. As discussed below, each managed file comprises an aggregation of one or multiple individual "user" files, thus reducing file management overhead costs.

Signal-Bearing Media

More specifically, in the context of FIGS. 1–2 the method aspect of the invention may be implemented, for example, by operating the data processing apparatus 108 (embodied by a digital data processing apparatus 200), to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method of storing and using "managed" files, each comprising an aggregation of one or multiple individual "user" files, in order to reduce file management overhead costs.

Figure 3:
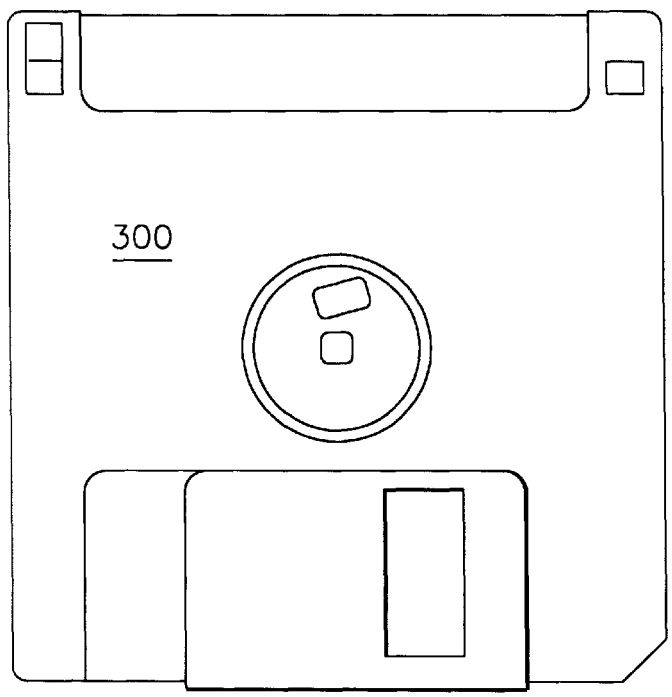
FIG. 3 shows an exemplary signal-bearing medium in accordance with the invention.

Illustratively, this signal-bearing media may comprise RAM (not shown) contained within the data processing apparatus 108, as represented by the fast-access storage 206 for example. Alternatively, the instructions may be contained in another signal-bearing media, such as a magnetic data storage diskette 300 (FIG. 3), directly or indirectly accessible by the processing unit 202. Whether contained in the digital data processing apparatus 200 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C, C++, PLX, etc.

File Aggregation: General Sequence

Figure 6:
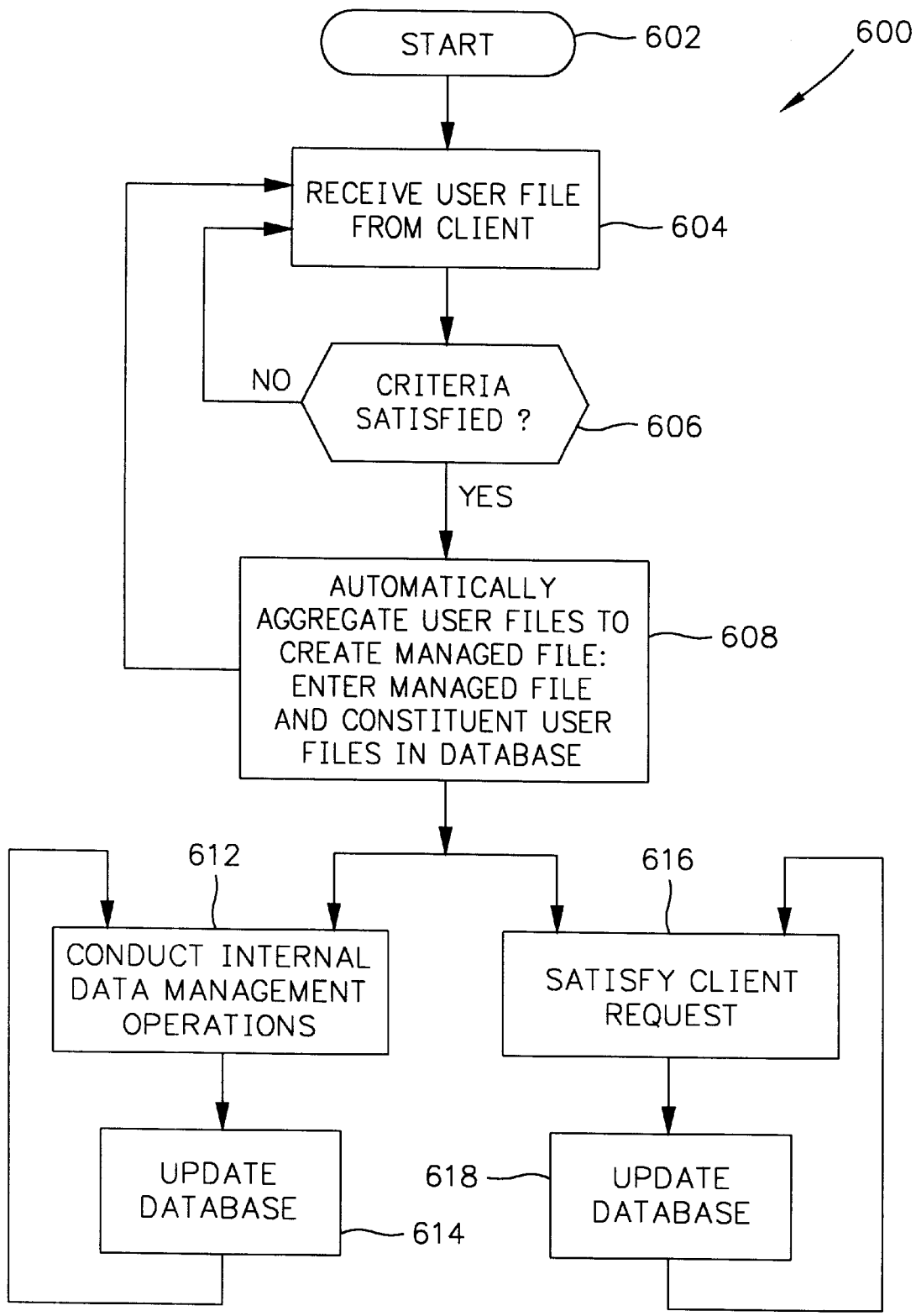
FIG. 6 is a flowchart of an operational sequence for data storage subsystem management with file aggregation.

FIG. 6 shows an operational sequence 600 to broadly illustrate the method aspect of the invention, according to one example of the invention. For ease of explanation, but without any limitation intended thereby, the sequence 600 of FIG. 6 is described in the context of the hardware of FIGS. 1–5, described above. After the sequence 600 is initiated in step 602, the subsystem 102 receives a user file from one of the client stations 106 in step 604.

Next, in step 606, the data processing apparatus 108 asks whether, having received the user file, predetermined criteria necessary to complete a managed file are now satisfied. These predetermined criteria, details of which are discussed below, determine how many user files go into the current aggregate file being created. If the criteria are satisfied, the processing apparatus 108 in step 608 creates a managed file. Otherwise, control returns to step 604 to receive another user file.

The predetermined criteria of step 606 may be implemented in a number of different ways, depending upon the needs of the application. For example, the criteria may comprise receipt (step 604) of a predetermined number of user files. For instance, a managed file may be created by including every ten user files received. In another example, the criteria may be specified by a client station 106, which manually identifies desired user files for inclusion into a managed file. In another example, the criteria may specify a target managed file size; when enough user files have been received to provide the desired size of managed file, the managed file is completed.

In still another example, the criteria may be established to coincide with a "commit transaction". Namely, the subsystem 102 may be implemented, aside from file aggregation, to delay commitment of data storage operations in the hierarchy 114 for a group of received user files until occurrence of a predetermined "commit" event. In this case, the predetermined criteria of step 606 may be designed to make managed files coincide with each group of user files together committed to storage. Under this arrangement, user files may be written to the storage hierarchy 114 upon receipt, with commitment being effectuated by representing the file in the database 113.

The criteria may also consider other factors, for example grouping received user files according to their location within a client station 106. As a further enhancement, the predetermined criteria of step 606 may recognize certain types of user files as being appropriate for being the sole user file in a managed file. Moreover, ordinarily skilled artisans (having the benefit of this disclosure) will recognize many completely different criteria suitable for step 606, without departing from the scope of this invention. Such criteria may further involve combinations and/or variations of such different criteria as well as the criteria discussed above.

When the predetermined criteria are satisfied, step 608 creates a managed file from the user files meeting the criteria. This step is performed by updating the database 113 to recognize the constituent user files (meeting the criteria) as a single managed file. In particular, the subsystem 102 in step 608 enters a representation of the newly created managed file and its constituent user files in the database 113. This involves entering: (1) the user files in the inventory table (e.g., Table 1, shown above), (2) the managed file in the storage table (e.g., Table 2, shown above), (3) the managed file and its constituent user files in the mapping table (e.g., Table 3, shown above), and (4) the managed file in the managed file attributes table (e.g., Table 4, shown above).

After step 610, the newly created managed file is available to participate in internal data management operations, and to satisfy client requests. More particularly, the managed file (and the previously created managed files), may be used to satisfy client requests as shown in step 616. Client requests may include many operations, such as user file delete, client retrieve, and client restore. These operations are discussed in greater detail below.

A representative client request is a "user file retrieve". This operation is initiated when the subsystem 102 receives a retrieval request from a client station 106, identifying a desired user file. In response, the subsystem 102 employs the mapping table to determine the identified user file's location within its managed file. Then, referencing the identified user file's location in the managed file, the subsystem 102 obtains a copy of the identified user file from the storage hierarchy 114. Finally, the subsystem 102 provides a copy of the sought user file to the requesting client station 106.

After step 616, step 618 is performed. Namely, if a client request renders the database 113 incomplete or incorrect, step 618 updates the database 113. For example, if a client request deletes a user file, step 618 deletes the user file from the inventory and mapping tables, and updates the managed file attributes table to show updated "active size" and "active files" data. After step 618, step 616 repeats to satisfy the next client request.

In contrast to the client requests (step 616), new and previously created managed files may also be involved in internal data management operations (step 612). A representative example of internal data management operations is an internal managed file copy operation, which may be performed as part of various other operations, such as data migration, reclamation, storage pool backup, and storage pool restore, each discussed in greater detail below. Particularly, in an internal managed file copy operation a managed file is copied as a contiguous unit from a first location in the data storage hierarchy 114 to a second location in the data storage hierarchy 114.

After step 612, step 614 is performed. Namely, if an internal data management operation renders the database 113 incomplete or incorrect, step 614 updates the database 113. For example, if a management operation consolidates a managed file, step 614 updates the storage table, mapping table, and managed file attributes table. After step 612, step 614 repeats to satisfy the next internal data management operation.

Satisfying Client Requests

Figure 7:
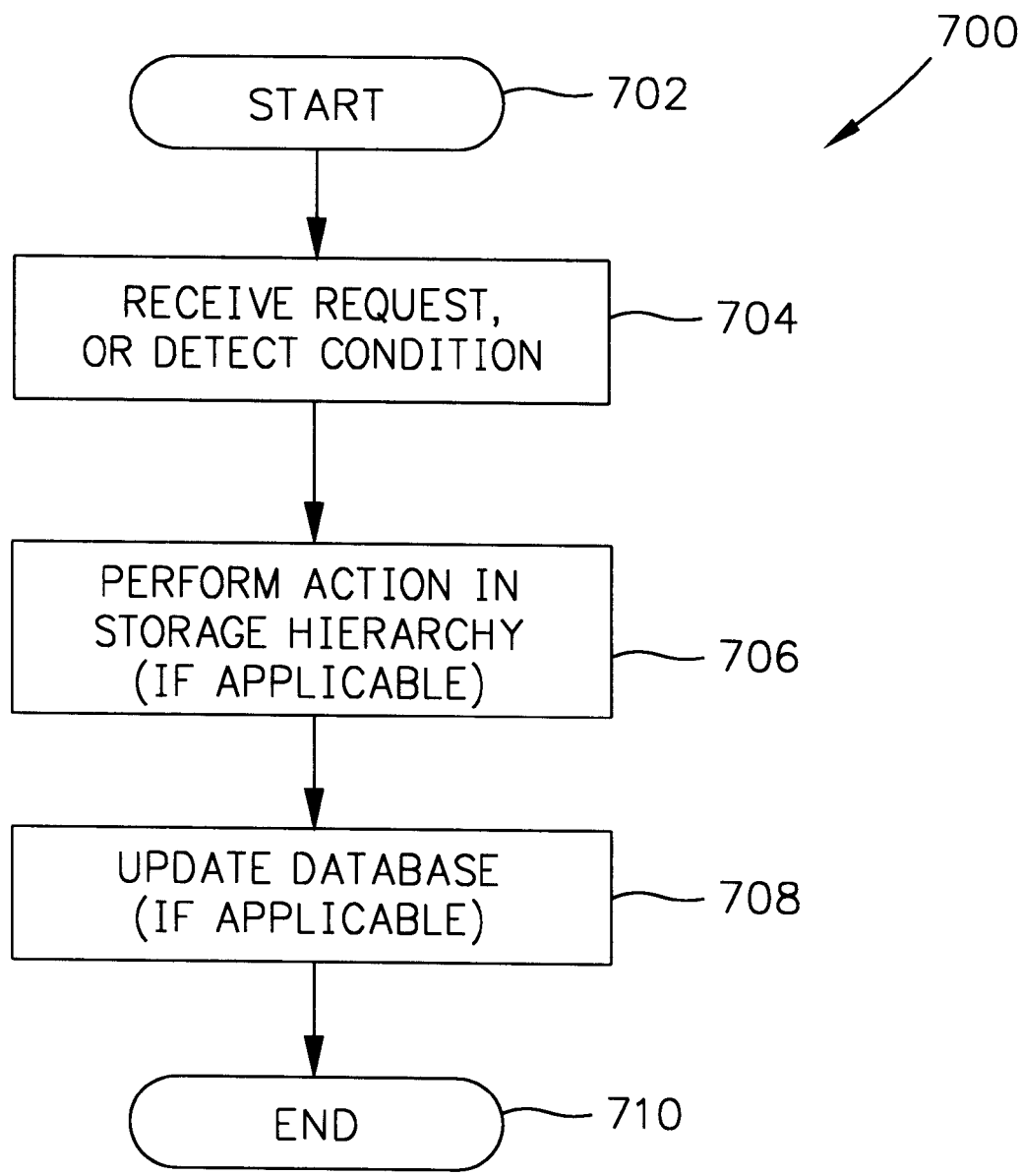
FIG. 7 is a flowchart of a general operational sequence for processing client requests and internal data management operations, in accordance with the invention.

As mentioned above, managed files may be used to satisfy various client requests, as shown in step 616 (FIG. 6). These processes are further illuminated with the following specific examples. FIG. 7 shows a broadly applicable operational sequence 700 to illustrate these examples. For ease of explanation, but without any limitation intended thereby, the sequence 700 of FIG. 7 is described in the context of FIGS. 1–6, described above. Although these operations analogously apply to managed files composed of a singly stored user file, the following discussions are aimed primarily at managed files composed of aggregated user files to illustrate some of the features and advantages of the invention.

Client Archive

In this operation, a client station 106 sends one or more user files for storage by the subsystem 102. As shown in FIG. 7, the interface 112 in step 704 receives a client request comprising an archive request. Also in step 704, the interface 112 receives a user file for archival.

Next, in step 706 the subsystem 102 performs the requested archival action by storing the user file in the storage hierarchy 114. As discussed above, various techniques may be employed to determine where files are stored in the storage hierarchy 114/400 (FIG. 4). In step 708, the subsystem 102 determines whether receipt of the user file satisfies predetermined criteria (as discussed above). If so, the processing apparatus 108 proceeds to create a managed file, as discussed above.

Specifically, step 708 enters a representation of the newly created managed file and its constituent user files in the database 113. More particularly, step 708 enters: (1) the user files in the inventory table (e.g., Table 1, shown above), (2) the managed file in the storage table (e.g., Table 2, shown above), (3) the managed files and its constituent user files in the mapping table (e.g., Table 3, shown above), and (4) the managed file in the managed file attributes table (e.g., Table 4, shown above).

After step 708, the client archive operation is complete, and the routine 700 ends in step 710.

Client Retrieve ("User File Retrieve")

In this operation, a client station 106 requests the subsystem 102 to retrieve a user file archived on the subsystem 102. Referring to FIG. 7, the operation is initiated in step 704 when the subsystem 102 receives a retrieval request from a client station 106, identifying a desired user file. In response, the subsystem 102 in step 706 employs the mapping table to determine the identified user file's location within one of the managed files; the subsystem 102 also employs the storage table to find where the managed file is stored in the hierarchy 114. Also in step 706, the subsystem 102 obtains a copy of the identified user file from the storage hierarchy 114. Continuing in step 706, the subsystem 102 provides a copy of the requested user file to the requesting client station 106.

As no action is required by step 708, the routine 700 ends in step 710.

Client Delete

In this operation, a client station 106 requests the subsystem 102 to delete an individual user file stored on the subsystem 102. Referring to FIG. 7, the operation begins in step 704 when the subsystem 102 receives a client delete request from a client station 106, identifying a desired user file. No action involving the requested file is performed in the storage hierarchy 114 (step 706).

However, in step 708 the subsystem 102 deletes appearance of the user file from the inventory table (e.g., Table 1) and mapping table (e.g., Table 3). Following this, the data processing apparatus 108 must also access the mapping table to determine whether the recently deleted user file was the managed file's last remaining file. If so, the data processing apparatus 108 also updates the database 113 by deleting appearance of the managed file in the storage table, mapping table, and managed file attributes table.

In contrast, if other user files still remain in the managed file, the data processing apparatus 108 updates the managed file attributes table (e.g., Table 4). This involves computing the active size and number of active files of the managed file affected by the deletion. The computed numbers are input into the managed file attributes table in step 708.

After step 708, the client delete operation is complete, and the routine 700 ends in step 710. Despite deletion of user files from an aggregate file, the remaining (non-deleted) user files retain their same relative order.

Client Backup

In this operation, a client station 106 supplies data for the subsystem 102 to maintain and also manage as a "backup" copy. This is in contrast to the archive operation, in which client stations 106 generally use the subsystem 102 as a remote data storage device.

With client backup, the routine 700 (FIG. 7) involves nearly the same steps as client archive operation (discussed above). However, in addition to the routine 700, the subsystem 102 conducts further operations to automatically maintain and manage multiple backup versions of data. The maintenance of such data may involve, for example, considerations such as the selection of separately fault-tolerant sections of the storage hierarchy 400 for storage of different "versions" of the data. The management of backup data may also involve, for example, automatically determining when to trigger a delete operation to remove client backup copies. This determination, for example, may be made in consideration of the data's age, version number, etc.

Client Restore

In this operation, a client station 106 requests the subsystem 102 to restore one or more user files from a backup copy maintained on the storage hierarchy 114. Presumably, a client station initiates a client restore operation as a result of destruction, loss, or other damage to user files.

With client restore, the routine 700 (FIG. 7) involves nearly the same steps as client retrieve operation (discussed above). However, since multiple versions may exist, the subsystem 102 must automatically identify the optimal version from which to conduct restoration. As an example, the subsystem 102 may select a most recent backup version to use as a restoration source.

Cache Use

The subsystem 102 may include one or more cache units (not shown), preferably comprising fast-access memory such as RAM. In such implementations, one application of the cache is to expedite updates to the database 113 (e.g., step 708, FIG. 7). For example, the data processing apparatus 108 may cache a storage table entry for a managed file whenever a client requests access to any user file within that managed file. Such client access may include, for example, client delete, client retrieve, and other operations. This cache operation anticipates future operations performed upon other user files in the same managed file.

A different application of the cache is to cache managed files themselves to expedite access to these files.

Internal Data Management Operations

In addition to their involvement in satisfying user requests, managed files may also be involved in various internal data management operations (e.g., step 612, FIG. 6). These processes are further illuminated with the following specific examples, explained with the aid of the broadly applicable operational sequence 700 (FIG. 7). For ease of explanation, but without any limitation intended thereby, the following references to FIG. 7 are described in the context of FIGS. 1–6, described above. Although these operations analogously apply to singly stored user files, the following discussions are aimed primarily at aggregate files to illustrate some of the features and advantages of the invention.

Managed File Copy

This operation involves copying a managed file from one location to another in the storage hierarchy 114. This operation is a necessary part of many other operations, such as migration, reclamation, storage pool backup, and storage pool restore. Advantageously, managed file copy is performed with drastically reduced file management overhead costs because many constituent user files are treated as a single aggregate file. This is possible because, in a managed file copy operation, a managed file is copied as a contiguous unit from a source location in the data storage hierarchy 114 to a second target in the data storage hierarchy 114. This operation is facilitated by the structure of the database 113, which permits treatment of the managed file as a single file.

Referring to FIG. 7, a managed file copy operation 700 starts in response to various conditions (step 704), such as the need to copy files during migration, storage pool restoration, storage pool backup, etc. Accordingly, in step 706 the subsystem 102 copies the designated managed files from a source location to a target location in the storage hierarchy 114. In some cases, this copy operation may be followed by a deletion of the original managed files, thereby effecting a "move" operation.

After step 706, the subsystem 102 updates the database 113 in step 708 to reflect certain new information regarding the managed files. Particularly, updates are made to the storage table to add the managed file's new storage location After step 708, the managed file copy operation is complete, and the routine 700 ends in step 710.

User File Identification

This operation involves identifying all constituent user files of a managed file. This operation may be performed as a subset of various operations conducted in the subsystem 102.

Referring to FIG. 7, a user file identification operation 700 starts in response to an internal request from a sub-process occurring in the subsystem 102. This request submits a managed file for which identification of all constituent user files is desired. (Optionally, the request may emanate from a client station 106, however the use of managed files are invisible to the client stations 106 in the illustrated embodiment.)

In step 706 the subsystem 102 performs action by accessing the database 113. In particular, the data processing apparatus 108 accesses the "managed→user" section of the mapping table (e.g., Table 3). Inputting the desired managed file yields all cross-referenced user files. Also in step 706, the data processing apparatus 108 provides the identified user files as an output to the requesting process.

After step 706, no action is needed in step 708. Accordingly, the user file identification operation is complete, and the routine 700 ends in step 710.

Managed File Move

This operation involves moving an entire managed file from one location to another in the storage hierarchy 114, and updating the database 113 accordingly. This operation is a necessary part of other operations, such as migration, reclamation, etc. Advantageously, managed file move involves significantly reduced file management overhead costs, due to the treatment of all constituent user files as a single aggregate file.

Referring to FIG. 7, a managed file move operation 700 may start in response to (1) receiving a request, e.g. from a sub-process being performed by the subsystem 102, or (2) detecting a condition, e.g. as a result of analysis determining when file movement is proper, such as automatic data migration (discussed below) based on criteria such as data age, level of use, etc.

In step 706, the subsystem 102 copies the designated managed file from one location to another in the storage hierarchy 114. Next, the database 113 is updated to remove reference to the original location of the managed file. Particularly, updates are made to the storage table to add the managed file's new storage location and delete the old location.

After step 708, the managed file move operation is complete, and the routine 700 ends in step 710.

Internal Delete

This operation deletes a user file in the same way that the client delete operation works, as discussed above. However, this operation starts in response to an internal subsystem 102 request rather than a client request.

Managed File Delete

To delete an entire managed file, each constituent user file is identified with the user file identification operation, discussed above. Then, each user file is deleted individually with a separate internal delete operation, as discussed above.

Migration

Referring to FIG. 4, this operation moves files from higher levels (e.g. 402, 404) to lower levels (e.g., 408, 410) in the storage hierarchy 400. Migration movement is preferably "downward" relative to FIG. 4, thereby moving files from more expensive to less expensive storage devices. In some cases, however, migration movement may be "upward" relative to FIG. 4. This may occur, for example, in response to recent, frequent, or anticipated use of the files.

Referring to FIG. 7, a migration operation 700 preferably starts automatically in response to the existence of a predetermined condition (step 704). As an example, this condition may be related to the data's recency of use, frequency of use, age, etc. Step 704 identifies each managed file to be migrated.

In response to the condition of step 704, subsystem 102 in step 706 copies the identified managed files from their original locations to various target locations in the storage hierarchy 114. The target locations may be selected under many different techniques, considering factors such as the size of the data, availability of potential target locations, etc.

After step 706, the subsystem 102 updates the database 113 to reflect the new locations of the managed files. Particularly, updates are made to the storage table to add the managed file's new storage location and delete the old location. Since the number or relative arrangement of user files is not changed during the move, updates are not needed to the mapping table or the managed file attributes table.

After step 708, the migration operation is complete, and the routine 700 ends in step 710.

Reclamation

This operation is automatically performed by the subsystem 102 to more compactly rewrite a unit of data storage, such as a volume, eliminating unused storage space between managed files and also consolidating aggregate files that contain unused space due to previously deleted user files. The consolidation of an aggregate file is called "reconstruction". Referring to FIG. 7, a reclamation operation starts in step 704 when the subsystem 102 detects existence of certain conditions. As an example, these conditions may include the presence of a threshold amount of wasted space among managed files in a particular data storage unit, volume, device, etc.

After step 704, the subsystem 102 consolidates the inefficiently stored managed files. As shown below, this is best implemented by moving the managed files to adjacent locations in the storage hierarchy 114, and concurrently consolidating managed files containing unused space. Next, in step 708 the subsystem 102 updates the database to reflect the results of this reclamation. This update involves changes to (1) the storage table, to indicate where each new managed file is now stored; (2) the mapping table, to accurately display the new user file offsets within their managed files; and (3) the managed file attributes table, to show each managed file's new "original size" and matching "active size".

After step 708, the reclamation process 700 is complete, and it ends in step 710. Despite reconfiguration of the aggregate file during reclamation, its user files always retain their same relative order.

Storage Pool Backup

This operation is performed by the subsystem 102, invisible to the client stations 106, to backup its own data. Each storage pool backup operation is performed for one of the "storage pools" of the storage hierarchy 114. As mentioned above, each "storage pool" preferably identifies a different group of storage devices with similar performance characteristics. For instance, referring to FIG. 4, the level 404 may be comprised of several storage pools, each pool including one or more similar DASDs. The storage pools are preferably assigned when the system 100 is originally installed or subsequently reconfigured.

Referring to FIG. 7, a storage pool backup operation 700 is performed in response to various conditions (step 704).

These conditions may be linked to characteristics of data stored in the pool (e.g., age, frequency of use, age of most recent backup, etc.), and serve to identify a storage pool ready for backup. Storage pool backup may also be initiated based upon a predetermined time schedule.

In response to these conditions, the subsystem 102 in step 706 incrementally copies all managed files of the storage pool into a different "target" location in a completely separate storage pool of the storage hierarchy 114. After step 706, the subsystem 102 updates the database 113 to reflect the newly created backup copy. This involves updating the storage table with entry of the new backup data. Also, the backup directory table is updated to designate the devices of the target location as backup devices.

After step 708, the storage pool backup operation is complete, and the routine 700 ends in step 710.

Storage Pool Restore

This operation is performed by the subsystem 102, invisible to the client stations 106, to restore its own data upon a failure. A storage pool restore operation is performed for a failed one of the "storage pools" of the storage hierarchy 114. As mentioned above, each "storage pool" identifies a different group of storage devices with similar performance characteristics.

Referring to FIG. 7, a storage pool restore operation 700 is performed in response to various conditions (step 704). Broadly, these conditions are related to the complete or partial failure of data stored in the pool. Accordingly, these conditions also serve to identify a storage pool suitable for restoration.

In response to these conditions, the subsystem 102 in step 706 identifies a backup copy of the storage pool, formed during a previous storage pool backup operation. This identification is performed using the backup directory table and storage table. Using this backup copy, the subsystem 102 copies all managed files of the backup copy into a different location in a completely separate storage pool of the storage hierarchy 114.

The new files will ultimately replace the files of the original storage pool, which has failed. In particular, after step 706 the subsystem 102 updates the database 113 to reflect the newly restored copy. This is achieved by updating the storage table with entry of the restored data in place of the failed data.

After step 708, the storage pool restore operation is complete, and the routine 700 ends in step 710.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A file management method performed in a storage management system including a data storage subsystem coupled to one or more client stations, comprising:

the subsystem receiving multiple user files from the client stations;

in response to receipt of the user files, applying predetermined criteria to designate groups of one or more received user files for aggregation;

for each designated group, creating a managed file comprising a contiguous aggregation of all constituent user files of that group, the creating of the managed file being transparent to the first client station;

providing a mapping table listing, for each user file, a corresponding location of that user file within a managed file;

conducting internal data management operations, including:

copying a first managed file as a contiguous unit from a first location in the data storage subsystem to a second location in the data storage subsystem;

satisfying client output requests, including:

receiving a retrieval request from a client station, said request identifying a first user file;

in response to the retrieval request, employing the mapping table to determine the first user file's location in a second managed file, referencing the first user file's location in the second managed file to obtain a copy of the first user file, and providing the copy to the requesting client station.

2. The method of claim 1, the creating of a managed file comprising storing all constituent user files of that managed file in the data storage subsystem.

3. The method of claim 1, the creating of a managed file including updating the mapping table to list the managed file and all constituent user files.

4. The method of claim 1, the mapping table further listing, for each managed file, all user files within the managed file.

5. The method of claim 4, the internal data management operations further comprising:

receiving an identification request specifying a third managed file;

in response to the identification request, employing the mapping table to identify all user files within the third managed file; and providing an output of the identified user files.

6. The method of claim 5, the method further comprising:

providing a storage table cross-referencing each managed file with an address in the subsystem containing that managed file;

deleting the third managed file from the storage table; and deleting all appearances of the third managed file and the identified user files from the mapping table.

7. The method of claim 1, the method further comprising:

providing a storage table cross-referencing each managed file with an address in the subsystem containing that managed file; and wherein the copying of the first managed file as a contiguous unit from a first location in the data storage subsystem to a second location in the data storage subsystem further includes updating the storage table to cross-reference the first managed file with the second location and deleting cross-referencing of the first managed file to the first location.

8. The method of claim 1, the method further comprising:

receiving a deletion request identifying a second user file; and in response to the deletion request, deleting all appearances of the user file from the mapping table.

9. The method of claim 8, the second user file being a member of a third managed file, the method further comprising:

consulting the mapping table to determine whether, after deletion of the second user file, the third managed file contains any other user files;

if not, deleting all appearances of the third managed file from the mapping table.

10. The method of claim 8, the subsystem including a cache, the second user file being a member of a third managed file, the method further comprising:
providing a storage table cross-referencing each managed file with an address in the subsystem containing that managed file;
in response to the deletion request, copying entry of the third managed file from the storage table to the cache.

11. The method of claim 1, wherein:
the method further includes the subsystem assigning groups of one or more user files for commitment to storage upon completion of commit conditions;
wherein the predetermined criteria comprises designation of user files for aggregation coincident with the assigned groups.

12. The method of claim 1, the predetermined criteria comprising designation of groups of user files for aggregation in accordance with directions received by a client station.

13. The method of claim 1, the predetermined criteria ensuring that all constituent user files in a group originate from no more than one client stations.

14. The method of claim 1, the predetermined criteria comprising designation of groups of user files for aggregation according to characteristics of the user files including at least one of the following: a target size of the managed file, a prespecified number of user files for inclusion in the managed file, a source location of the user files, and a prespecified storage location for the user files.

15. The method of claim 1, the method further comprising:
providing an inventory table associating each user file with source information including at least one of the following: an originating client station, and an original storage location at the client station.

16. The method of claim 1, the method further comprising:
providing a storage table cross-referencing each managed file with an address in the subsystem containing that managed file.

17. The method of claim 16, the subsystem including a cache, the method further comprising:
in response to the retrieval request, copying entry of the second managed file from the storage table to the cache.

18. A signal-bearing medium tangibly embodying a program of machine-readable instructions executable by a digital processing apparatus to perform a method for file management in a storage management system including a data storage subsystem coupled to one or more client stations, said method comprising:
the subsystem receiving multiple user files from the client stations;
in response to receipt of the user files, applying predetermined criteria to designate groups of one or more received user files for aggregation;
for each designated group, creating a managed file by comprising a contiguous aggregation of all constituent user files of that group, the creating of the managed file being transparent to the first client station;
providing a mapping table for each user file, a corresponding location of that user file within a managed file;
conducting internal data management operations, including:
copying a first managed file as a contiguous unit from a first location in the data storage subsystem to a second location in the data storage subsystem;
satisfying client output requests, including:
receiving a retrieval request from a client station, said request identifying a first user file;
in response to the retrieval request, employing the mapping table to determine the first user file's location in a second managed file, referencing the first user file's location in the second managed file to obtain a copy of the first user file, and providing the copy to the requesting client station.

19. The medium of claim 18, the creating of a managed file comprising storing all constituent user files of that managed file in the data storage subsystem.

20. The medium of claim 18, the creating of a managed file including updating the mapping table to list the managed file and all constituent user files.

21. The medium of claim 18, the mapping table further listing, for each managed file, all user files within the managed file.

22. The medium of claim 21, the internal data management operations further comprising:
receiving an identification request specifying a third managed file;
in response to the identification request, employing the mapping table to identify all user files within the third managed file; and
providing an output of the identified user files.

23. The medium of claim 22, the method further comprising:
providing a storage table cross-referencing each managed file with an address in the subsystem containing that managed file;
deleting the third managed file from the storage table; and
deleting all appearances of the third managed file and the identified user files from the mapping table.

24. The medium of claim 18, the method further comprising:
providing a storage table cross-referencing each managed file with an address in the subsystem containing that managed file; and
wherein the copying of the first managed file as a contiguous unit from a first location in the data storage subsystem to a second location in the data storage subsystem further includes updating the storage table to cross-reference the first managed file with the second location and deleting cross-references of the first managed file to the first location.

25. The medium of claim 18, the method further comprising:
receiving a deletion request identifying a second user file; and in response to the deletion request, deleting all appearances of the user file from the mapping table.

26. The medium of claim 25, the second user file being a member of a third managed file, the method further comprising:
consulting the mapping table to determine whether, after deletion of the second user file, the third managed file contains any other user files;
if not, deleting all appearances of the third managed file from the mapping table.

27. The medium of claim 25, the subsystem including a cache, the second user file being a member of a third managed file, the method further comprising:
providing a storage table cross-referencing each managed file with an address in the subsystem containing that managed file;

in response to the deletion request, copying entry of the third managed file from the storage table to the cache.

28. The medium of claim 18, wherein:

the method further includes the subsystem assigning groups of one or more user files for commitment to storage upon completion of commit conditions;

wherein the predetermined criteria comprises designation of user files for aggregation coincident with the assigned groups.

29. The medium of claim 18, the predetermined criteria comprising designation of groups of user files for aggregation in accordance with directions received by a client station.

30. The medium of claim 18, the predetermined criteria comprising designation of groups of user files for aggregation according to characteristics of the user files including at least one of the following: a target size of the managed file, a number of user files for inclusion in the managed file, a source location of the user files, and a prespecified storage location for the user files.

31. The medium of claim 18, the method further comprising:

providing an inventory table associating each user file with source information including at least one of the following: an originating client station, and an original storage location at the client station.

32. The medium of claim 18, the method further comprising:

providing a storage table cross-referencing each managed file with an address in the subsystem containing that managed file.

33. The medium of claim 32, the subsystem including a cache, the method further comprising:

in response to the retrieval request, copying entry of the second managed file from the storage table to the cache.

34. A data storage subsystem, comprising:

a storage hierarchy;

a database; and a digital data processing apparatus coupled to the storage hierarchy and the database;

wherein the digital data processing apparatus is programmed to perform a file management method, said method comprising:

the subsystem receiving multiple user files from the client stations;

in response to receipt of the user files, applying predetermined criteria to designate groups of one or more received user files for aggregation;

for each designated group, creating a managed file comprising a contiguous aggregation of all constituent user files of that group, the creating of the managed file being transparent to the first client station;

providing a mapping table listing, for each user file, a corresponding location of that user file within a managed file;

conducting internal data management operations, including:

copying a first managed file as a contiguous unit from a first location in the data storage subsystem to a second location in the data storage subsystem;

satisfying client output requests, including:

receiving a retrieval request from a client station, said request identifying a first user file;

in response to the retrieval request, employing the mapping table to determine the first user file's location in a second managed file, referencing the first identified user file's location in the second managed file to obtain a copy of the first user file, and providing the copy to the requesting client station.

35. The subsystem of claim 34, the creating of a managed file comprising storing all constituent user files of that managed file in the data storage subsystem.

36. The subsystem of claim 34, the creating of a managed file including updating the mapping table to list the managed file and all constituent user files.

37. The subsystem of claim 34, the storage hierarchy including one or more different storage pools, each storage pool including one or more substantially identical storage devices.

38. The subsystem of claim 34, the database being contained on one or more data storage devices of the storage hierarchy.

39. The subsystem of claim 34, the mapping table being contained in the database.

40. The subsystem of claim 34, the first and second locations in the data storage subsystem residing in the storage hierarchy.

41. The subsystem of claim 34, the mapping table further listing, for each managed file, all user files within the managed file.

42. The subsystem of claim 41, the internal data management operations further comprising:

receiving an identification request specifying a third managed file;

in response to the identification request, employing the mapping table to identify all user files within the third managed file; and providing an output of the identified user files.

43. The subsystem of claim 42, the method further comprising:

providing a storage table cross-referencing each managed file with an address in the subsystem containing that managed file;

deleting the third managed file from the storage table; and deleting all appearances of the third managed file and the identified user files from the mapping table.

44. The subsystem of claim 34, the method further comprising:

providing a storage table cross-referencing each managed file with an address in the subsystem containing that managed file; and wherein the copying of the first managed file as a contiguous unit from a first location in the data storage subsystem to a second location in the data storage subsystem farther includes updating the storage table to cross-reference the first managed file with the second location and deleting cross-referencing of the first managed file to the first location.

45. The subsystem of claim 34, the method further comprising:

receiving a deletion request identifying a second user file; and in response to the deletion request, deleting all appearances of the user file from the mapping table.

46. The subsystem of claim 45, the second user file being a member of a third managed file, the method further comprising:

consulting the mapping table to determine whether, after deletion of the second user file, the third managed file contains any other user files;

if not, deleting all appearances of the third managed file from the mapping table.

47. The subsystem of claim 45, the subsystem including a cache, the second user file being a member of a third managed file, the method further comprising:

providing a storage table cross-referencing each managed file with an address in the subsystem containing that managed file;

in response to the deletion request, copying entry of the third managed file from the storage table to the cache.

48. The subsystem of claim 34, wherein:

the method further includes the subsystem assigning groups of one or more user files for commitment to storage upon completion of commit conditions;

wherein the predetermined criteria comprises designation of user files for aggregation coincident with the assigned groups.

49. The subsystem of claim 34, the predetermined criteria comprising designation of groups of user files for aggregation in accordance with directions received by a client station.

50. The subsystem of claim 34, the predetermined criteria comprising designation of groups of user files for aggregation according to characteristics of the user files including at least one of the following: a target size of the managed file, a prespecified number of user files for inclusion in the managed file, a source location of the user files, and a prespecified storage location for the user files.

51. The subsystem of claim 34, the method further comprising:

providing an inventory table associating each user file with source information including at least one of the following: an originating client station, and an original storage location at the client station.

52. The subsystem of claim 34, the method further comprising:

providing a storage table cross-referencing each managed file with an address in the subsystem containing that managed file.

53. The subsystem of claim 52, the subsystem including a cache, the method further comprising:

in response to the retrieval request, copying entry of the second managed file from the storage table to the cache.

54. The subsystem of claim 45, the subsystem including a cache, the method further comprising:

providing a storage table cross-referencing each managed file with an address in the subsystem containing that managed file;

in response to the deletion request, copying entry of the managed file from the storage table to the cache.

55. A data storage subsystem, comprising:

a data storage unit, containing multiple managed files, each managed file including multiple user files; and a database containing data concerning predetermined characteristics of files stored in the data storage unit, the database comprising:

a mapping table that lists (1) for each managed file, all user files included in the managed file, and (2) for each user file, all managed files containing that user file; and a storage table that lists an address in the data storage unit at which each managed file is located.

56. The subsystem of claim 55, where the data storage unit further includes at least one managed file containing a single user file.

57. The subsystem of claim 55, the database further comprising:

a mapping file attributes table that contains information including at least one of the following, for each managed file: (1) a number of user files within that managed file, (2) a total size of the managed file upon its creation, and (3) a current size of the managed file comprising the total size reduced by sizes of any user files deleted from the managed file.

58. The subsystem of claim 55, where all user files in each managed file are stored substantially contiguously.

59. The subsystem of claim 55, the address comprising an address in the data storage unit at which each managed file begins.

60. The subsystem of claim 55, the mapping table further including:

for each user file contained in a managed file, an indicator representing a relative position of the user file within the managed file.

61. The subsystem of claim 60, the indicator comprising:

an offset value representing a difference between a starting address of the managed file and a starting address of the user file.

* * * * *